(12) United States Patent
Schieweck et al.

(10) Patent No.: US 6,474,821 B2
(45) Date of Patent: Nov. 5, 2002

(54) ADJUSTING DEVICE FOR MOTOR VEHICLE OUTSIDE MIRRORS

(75) Inventors: Arno Schieweck, Kleinlangheim (DE); Andreas Harbauer, Nuremberg (DE)

(73) Assignee: Buehler Motor GmbH, Nuremberg (DE)

(*) Notice: Subject to any disclaimer, the term of this patent is extended or adjusted under 35 U.S.C. 154(b) by 0 days.

(21) Appl. No.: 09/989,168

(22) Filed: Nov. 21, 2001

(65) Prior Publication Data

US 2002/0063979 A1 May 30, 2002

(30) Foreign Application Priority Data

Nov. 25, 2000 (DE) .......................................... 100 58 725

(51) Int. Cl.⁷ .............................................. G02B 7/182
(52) U.S. Cl. .................... 359/877; 359/871; 359/872; 359/841
(58) Field of Search ................................ 359/877, 871, 359/872, 873, 841, 842, 509, 507, 876; 248/474, 476

(56) References Cited

U.S. PATENT DOCUMENTS

| 4,701,037 A | * 10/1987 | Bramer ....................... 248/481 |
| 4,973,820 A | 11/1990 | Mittelhäuser |
| 5,166,825 A | * 11/1992 | Fujie et al. .................. 310/365 |
| 5,781,356 A | * 7/1998 | Okada et al. ................ 359/841 |
| 6,170,957 B1 | 1/2001 | Kaspar |
| 6,244,714 B1 | 6/2001 | Mertens |

FOREIGN PATENT DOCUMENTS

GB  2 225 993 A  6/1990  ............. B60R/1/06

* cited by examiner

Primary Examiner—Mohammad Sikder
(74) Attorney, Agent, or Firm—Jacobson Holman PLLC

(57) ABSTRACT

Adjusting device for the outside mirror of a motor vehicle, comprising a drive housing, on which is mounted by means of a central ball and cap bearing a mirror glass carrier, which is provided with intersecting metal toothed strips, chains or the like, which, enveloping the shell-like drive housing, are in engagement with the output toothed gears of two drive motors, disposed in the drive housing, and comprising an electric contactor for the mirror glass to supply electric energy for the mirror heater, the mirror dimmer or other consuming devices, whereby the energy is transported by means of toothed strips, which are electrically insulated from each other in the crossing area.

7 Claims, 2 Drawing Sheets

ADJUSTING DEVICE FOR MOTOR VEHICLE OUTSIDE MIRRORS

BACKGROUND OF THE INVENTION (1) Field of The Invention

The invention relates to an adjusting device for the outside mirror of a motor vehicle, in general, and to a motor vehicle mirror system having a compact electrical network, in particular.

(2) Description of Related Art

The invention relates to an adjusting device for an outside mirror system of a motor vehicle. The mirror system includes a drive housing, on which is mounted a mirror glass carrier, that is provided with intersecting toothed strips. The intersecting strips are in engagement with the output toothed gears of two drive motors, disposed in the drive housing. The mirror system includes an electric contactor for the mirror glass to supply electric energy for the mirror heater, the mirror dimmer or other consuming devices.

A significant problem with such adjusting devices is the electric contacting of the mirror glass and the supply of energy from the outside source of current to the consuming devices, be it for the mirror heater, the mirror dimmer, the electrical drive or the like. In addition to direct contact of the mirror glass from the outside, solutions have also been proposed wherein the energy is fed in by way of a plug in the drive housing, routed through its interior and looped through the drive housing's passages facing the mirror glass carrier, in order to then be connected to contacts on the mirror glass. However, all these prior art variants are complicated in their construction and also very time consuming to assemble.

Therefore, the invention is based on the problem of designing an adjusting device of the aforementioned class in such a manner that with a simple design and very simple assembly, electrical energy can be transported from the outside source of energy to the consuming devices.

BRIEF SUMMARY OF THE INVENTION

The present invention provides a solution to the aforementioned problem in that electrical energy is transported by means of toothed strips, which are electrically insulated from each other in the crossing area, a feature that occurs preferably in such a manner that the contacting of the toothed strips for supplying electric energy ensues over brush springs, permanently connected to the drive housing.

In a first embodiment, these brush springs can extend through passages of the drive housing and rest preferably along the interior against smooth sections of the toothed strips, whereby they can be connected preferably to a feeder plug element, which penetrates from the side of the drive housing and is expediently molded to the same.

In a second embodiment the brush springs in turn can be positioned along the outside preferably against smooth sections of the toothed strips. Thus, in this case the brush springs are between the drive housing and the enveloping outer housing of the outside mirror of the motor vehicle so that, as an alternative to mounting on the drive housing, they can also be hinged rigidly to the outer housing itself that is connected to the drive housing.

In accordance with the invention, to obtain good electrical contact between the ends of the toothed strips and the mirror glass during any swivel movements of the mirror glass surface, the contact ends of the toothed strips rest against mating contacts of the mirror glass by means of arched sections of preferably U-shaped contact springs. Then, when the mirror glass carrier is swiveled in relation to the drive housing, the arched sections roll down on the mating contacts.

Other advantages, features and details of the invention are disclosed in the following description of two embodiments and with reference to the drawings.

DETAILED DESCRIPTION OF THE INVENTION

Figure 1:
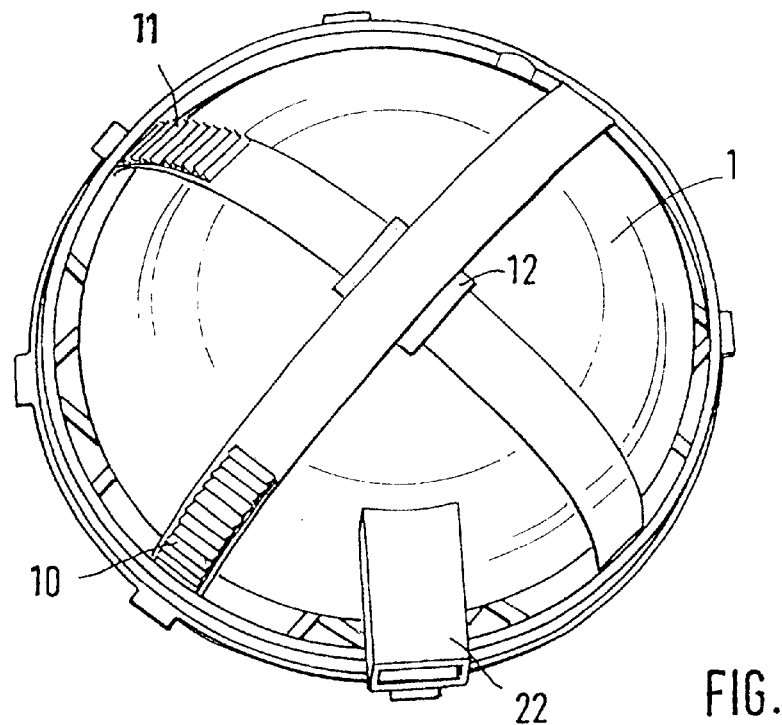
FIG. 1 is a perspective view of the inventive adjusting device from the rear.
Figure 2:
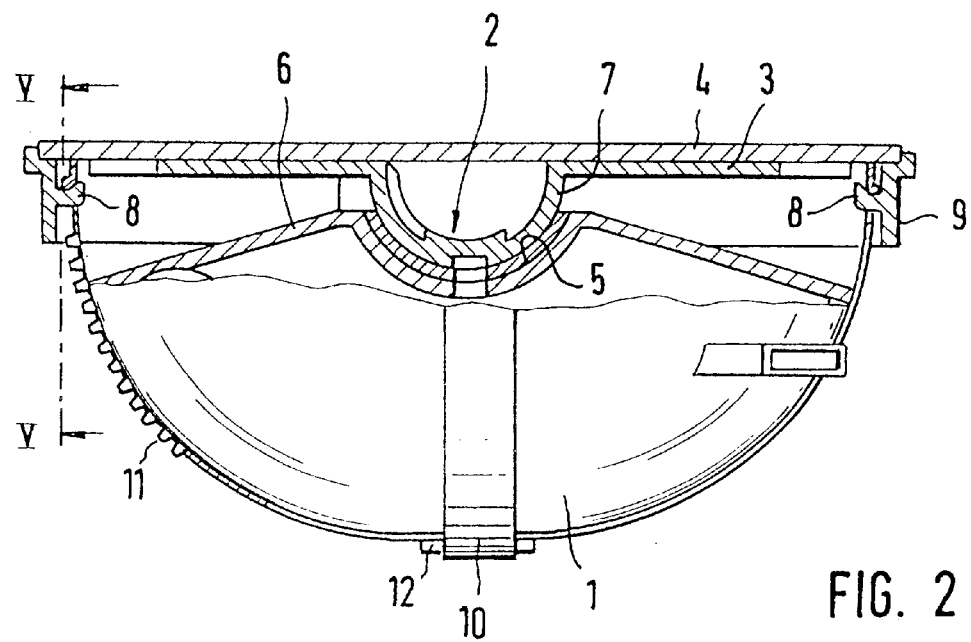
FIG. 2 is a partially cut side view of the adjusting device, according to FIG. 1.

The adjusting device, depicted in FIGS. 1 and 2, comprises a drive housing 1 and a mirror glass carrier 3, which is hinged to the drive housing by way of a ball and cap bearing 2 and on which the actual mirror glass 4 is held. The ball and cap bearing 2 is formed by means of a hemispherical joint cap 5, which is molded into the wall 6, that faces the mirror carrier and belongs to the drive housing, and a hemispherical joint ball 7, molded concentrically as part of the mirror glass carrier 3. Two intersecting toothed strips 10 and 11 are fastened to attachment members 8 of a peripheral ring wall 9 of the mirror glass carrier 3. The toothed strips encircle the hemispherical drive housing. Because of their elastic design, which can even be reinforced, if desired, by means of additional undulations, the toothed strips force the joint ball 7 into the joint cap 5 and thus prevent the drive housing and the mirror glass carrier from falling apart. The output toothed gears (not illustrated) of the adjusting motors, disposed in the interior of the drive housing, mate with the toothed sections of the toothed strips, which are also supposed to exhibit smooth unseparated sections, in order to swivel the mirror glass carrier 3 about two axes, which cross each other perpendicularly and which are formed by means of the connecting lines of the attachment members 8 of the two toothed strips.

According to the invention, the toothed strips 10 and 11 are supposed to serve not only to hold the drive housing together with the mirror glass carrier and to accomplish the swivel adjustment, but also to assume simultaneously the transport of electrical energy. To this end, the toothed strips 10 and 11 are insulated from each other by means of an insulating plate 12 in the crossing area and connected to the outside current source 26 by means of brush springs 13. Each end of the toothed strips 10, 11, which are contacted in this manner, is connected to a mating contact 14 or 15, for example, of the mirror heater 16 or another consumer device.

Figure 3:
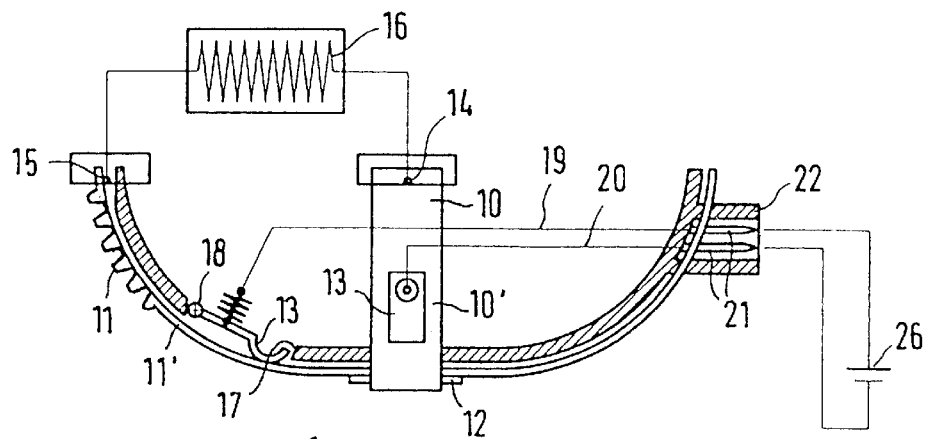
FIG. 3 is a schematic cross sectional view of the adjusting device to illustrate the transport of electrical energy over the toothed strips for contacting from the inside.

In the embodiment, according to FIG. 3, depicting a very simplified schematic drawing of a sectional view of the adjusting device as compared to that in FIG. 2, the brush springs 13, extending through passages 17 of the drive housing 1, rest along the interior against a smooth section 11' or 10' of the toothed strips 10 and 11. The swivel bearing 18 of the brush springs is connected permanently to the drive housing 1. In this embodiment, according to FIG. 3, the brush springs are connected by means of connecting lines 19 and 20 to the electric contacts 21 of a plug element 22, molded to the side of the drive housing 1, from where the connection to the electric supply source 26 is made by way of mating plug connections (not illustrated). The lines 19 and 20 can be both loosely laid lines and deflectors, disposed, for example on the inside of the drive housing 1.

Figure 4:
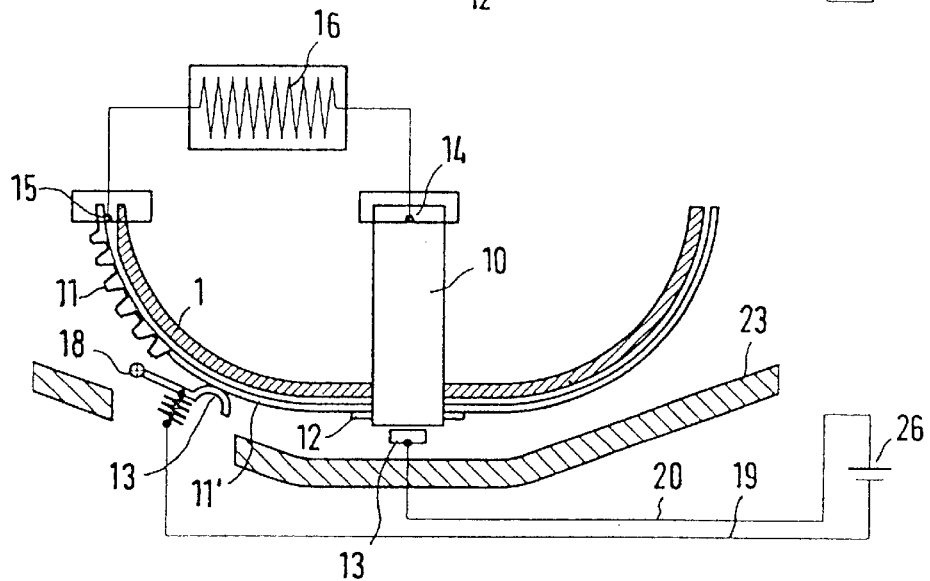
FIG. 4 is a schematic sectional view, according to FIG. 3, for contain the toothed strips from the outside.

In another embodiment, according to FIG. 4, the toothed strips 10, 11 make contact by way of the brush springs 13 from the outside, whereby the swivel point 18 can be affixed both next to the respective toothed strips 10, 11 on the drive housing 1 and, if desired, on the outer housing 23 of the outside mirror, as indicated in the drawing.

Figure 5:
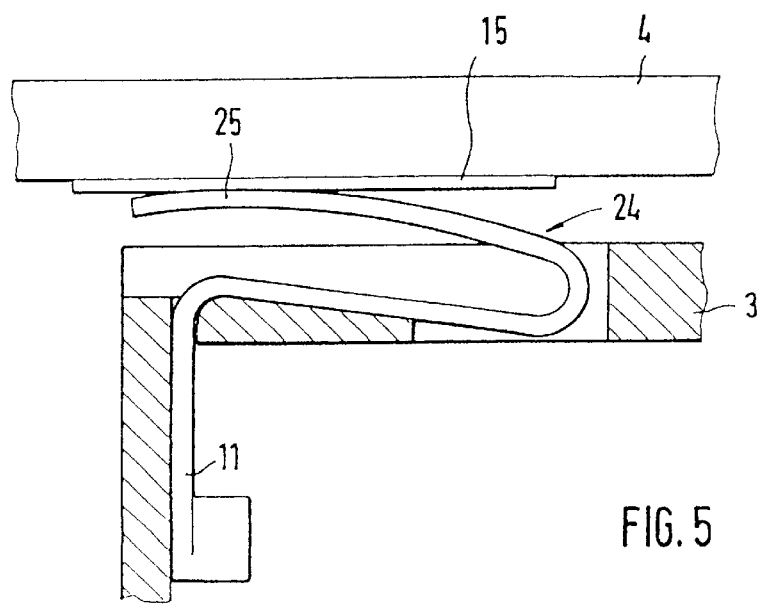
FIG. 5 is an enlarged sectional view along the line V—V in FIG. 2 to illustrate the contacting of the mating contacts on the mirror glass.

The enlarged sectional drawing in FIG. 5 shows a contact spring 24 on the end of one of the toothed strips for example toothed strip 11, with whose aid the mating contacts, here mating contact 15, of the mirror glass 4, make conductive contact. For this purpose the abutting spring leg is provided with an arched section 25 so that during the relative movement of the mirror glass 4 and the mating contact 15 in relation to the contact spring as a consequence of swiveling the mirror glass with the mirror glass carrier 31 a rolling off movement takes place and thus the electric contact always exhibits the same quality without any damage to the mating contact.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An adjusting device for the outside mirror of a motor vehicle for use with the output toothed gears of two drive motors, the outside mirror including at least one consuming device, the adjusting device comprising:
   a shell-like drive housing;
   a mirror glass carrier mounted on the drive housing;
   intersecting metal-toothed strips encircling the shell-like drive housing;
   at least one electrical contact in electrical contact with the toothed strips to provide electrical energy to at least one consuming device;
   means for electrically insulating the toothed strips from each other.

2. The adjusting device, as claimed in claim 1, wherein the toothed strips for supplying electric energy make contact over brush springs, permanently connected to the drive housing.

3. The adjusting device, as claimed in claim 2, wherein the brush springs extend through passages of the drive housing and are positioned on the interior preferably against smooth sections of the toothed strips.

4. The adjusting device, as claimed in claim 3, wherein the brush springs are connected to a feeder plug element, which penetrates from the outside of the drive housing and is preferably molded to the same.

5. The adjusting device, as claimed in claim 2, wherein the brush springs are positioned on the outside against smooth sections of the toothed strip.

6. The adjusting device, as claimed in claim 5, wherein the brush springs are fastened on the inside of the outer housing of the outside mirror.

7. The adjusting device, as claimed in claim 1, wherein the contact ends of the toothed strips rest against the mating contacts of the mirror glass by means of arched sections of preferably U-shaped contact springs.

* * * * *